United States Patent [19]

Golob et al.

[11] Patent Number: 4,592,398

[45] Date of Patent: Jun. 3, 1986

[54] CONTINUOUS TREE HARVESTOR

[75] Inventors: Theodore B. Golob, Ottawa; Wim Gilles, Gloucester; Stan K. Jasinski; Patrick B. G. Whitehead, both of Woodstock, all of Canada

[73] Assignee: Canadian Patents and Development Limited, Ottawa, Canada

[21] Appl. No.: 681,652

[22] Filed: Dec. 14, 1984

[51] Int. Cl.[4] ............................................... A01G 23/08
[52] U.S. Cl. .................................... 144/3 D; 56/13.3; 144/34 R
[58] Field of Search ............... 144/3 D, 34 R, 335, 144/336; 83/928; 56/13.3, 13.9, 14.5, 27.5; 30/379.5

[56] References Cited

U.S. PATENT DOCUMENTS

| | | | |
|---|---|---|---|
| 3,704,801 | 12/1972 | Stair | 144/34 A |
| 4,125,987 | 11/1978 | Krone et al. | 56/13.3 |
| 4,270,586 | 6/1981 | Hyde et al. | 144/34 R |
| 4,445,552 | 1/1984 | Hyde et al. | 144/3 D |
| 4,467,849 | 8/1984 | Denis | 144/3 D |

FOREIGN PATENT DOCUMENTS 898661  4/1972  Canada ............... 144/34 R

Primary Examiner—W. D. Bray
Attorney, Agent, or Firm—Ronald G. Bitner

[57] ABSTRACT

A tree harvesting apparatus which allows continuous travel through the trees, cutting them, accumulating them into bundles, and unloading the bundles without stopping.

10 Claims, 2 Drawing Figures

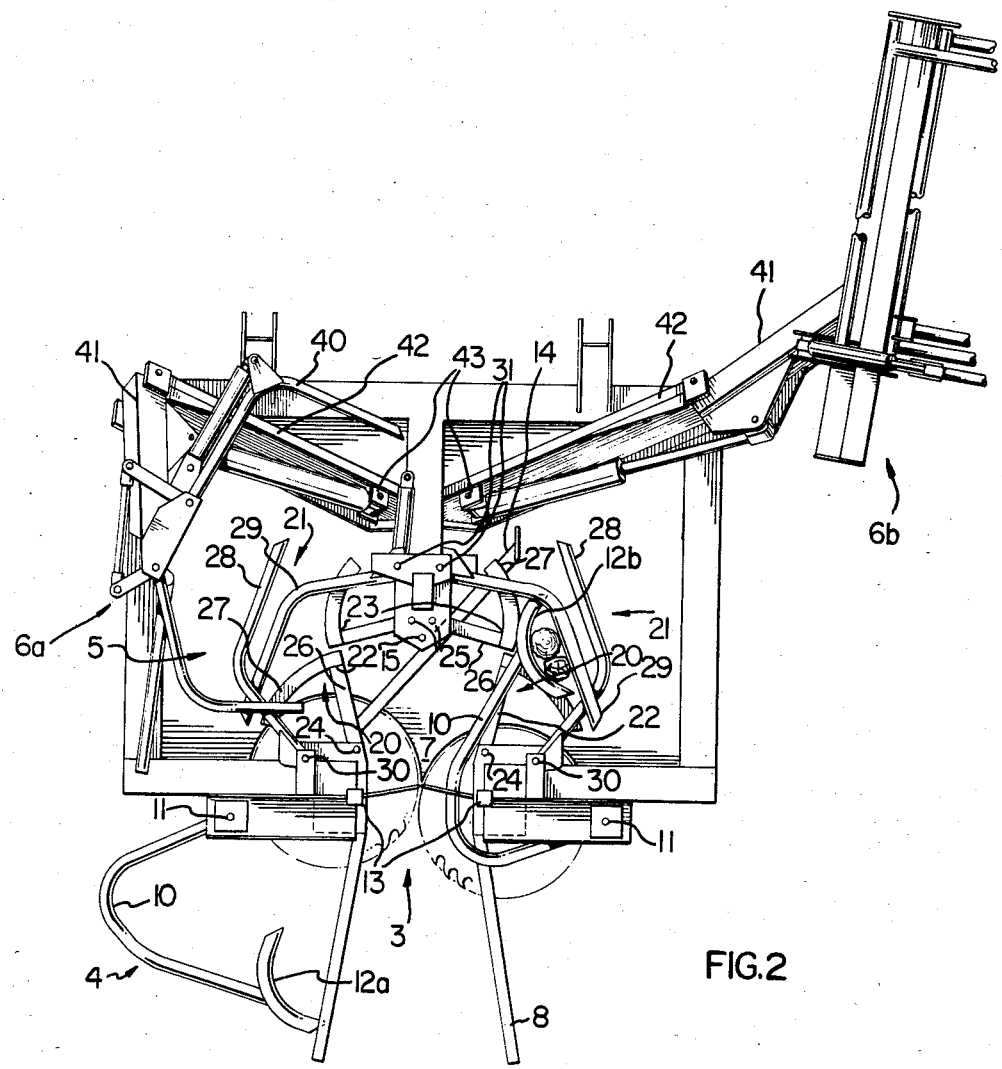

CONTINUOUS TREE HARVESTOR

BACKGROUND OF THE INVENTION

This invention relates to tree harvesting, and particularly to a machine for the rapid harvesting of short rotation forest plantations.

Short rotation silvaculture involves the plantation growth of special hydrid trees in a regular grid pattern for repeated harvest and regrowth from the same stump or coppice. Currently short rotation is being applied to hardwood trees. The crop regrows from the harvested stump and consequently damage to the stump which may facilitate disease, must be avoided.

Current methods available to harvest these trees include cutting with chainsaws and forwarding by skidding individual trees or cutting with a hydraulic shear on a feller-buncher and then skidding small bunches of trees. Chain sawing leaves a healthy stump but skidding of individual trees or the separate operation of bunching them for skidding is too slow and costly. Shearing with a feller-buncher damages the stump and is also slow because of the necessity to stop, manipulate and unload a bunch of trees.

SUMMARY OF THE INVENTION

The present invention provides a machine which moves continually through the trees, cutting them, collecting them into bundles, and unloading the bundles without stopping.

The tree harvestor of the present invention comprises tree severing means, tree feeding means, an accumulator and an unloading device. The accumulator accumulates severed upright trees and has an inlet and outlet that allows unloading and infeeding at the same time so that there is no need to stop cutting and forward travel, while unloading.

BRIEF DESCRIPTION OF THE DRAWINGS

FIG. 2 is a plan view of the harvestor of FIG. 1.

DESCRIPTION OF PREFERRED EMBODIMENT

Figure 1:
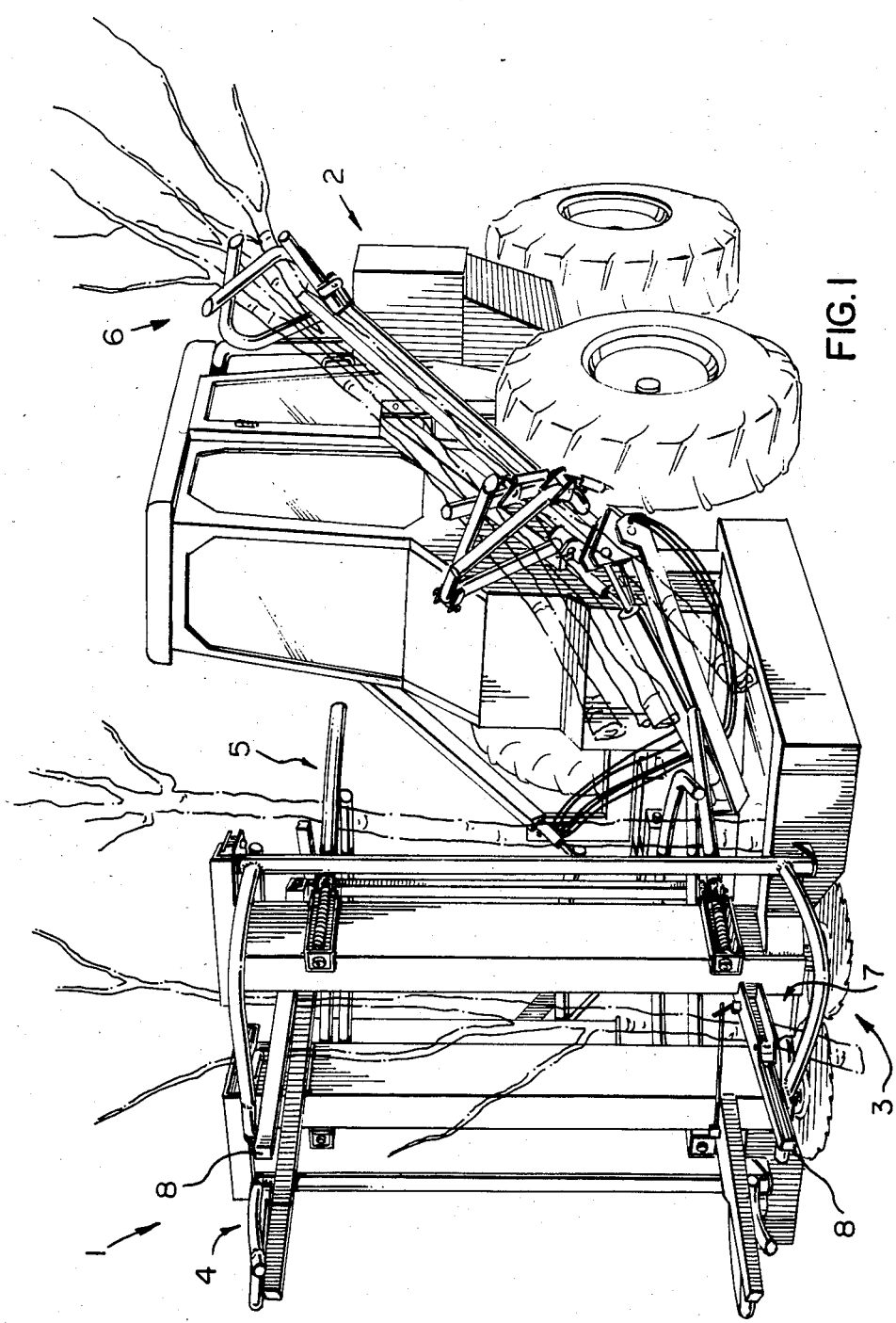
FIG. 1 is a perspective view of a tree harvestor in accordance with the present invention.

With reference to the drawings, the tree harvestor 1 of the present invention is shown attached to a vehicle 2 by suitable support means. The harvestor comprises tree severing means 3, feeding means 4 for advancing severed upright trees along a generally horizontal support surface to accumulator 5, and an unloading device 6.

With particular reference to FIG. 2, the tree severing means 3 is shown in the form of a pair of circular saws in proximity with one another driven by suitable motors, for rotation about generally vertical axis. Behind the saws is a generally horizontal support surface 7 for supporting the severed upright trees. Guide means 8 spaced above the support surface 7 guide the trees into the saw and maintain them upright.

FIG. 1 shows two feeding devices 4 each comprising a plurality of vertically spaced generally horizontal arms 10 mounted for pivoting about a generally vertical axis 11. The arms include a tree engaging portion 12. The arms are driven by a suitable actuator, in response to sensing means 13 that detects the presence of a tree. The actuator pivots the tree engaging portion 12 from a position in front of a tree, as shown for 12a, through the accumulator 5, as shown for 12b, conveying with it the severed upright tree, and then returned to the original position.

If two accumulators are used, a diverter vane 14 is used, which can pivot about pivot 15 between one of two positions to direct trees to the chosen accumulator.

Each of the accumulators 5 comprise an inlet gate 20 and an outlet gate 21. The inlet gate comprises pairs of generally horizontal arms 22 and 23 each pivotally mounted about a generally vertical axis 24 and 25, spaced from one another. Each arm has a generally radial portion 26 and an arcuate portion 27 spaced from and generally concentric with the respective vertical axis 24 or 25. The arms 22 are biased, by a spring or the like, towards one another. Limit means limits pivoting in the direction effected by the bias means, to the position as shown in FIG. 2. The inlet gates 20 allow severed trees to enter the accumulator but prevents them from leaving. The outlet gate 22 comprises a pair of generally horizontal arms 28 and 29 each pivotally mounted about a generally vertical axis 30 and 31 spaced from one another. The arms are biased towards one another to retain severed trees in the accumulator in the upright condition but allowing them to be withdrawn by the unloading device 6.

With reference to FIG. 2, each of the unloading devices 6 comprises a grapple 40 and a linkage mechanism comprising arms 41 and 42, that connect the grapple with the harvestor. The pivotal connection 43 is skewed such that the grapple 40 orientation changes from substantially vertical in the grasping position, as shown for unloading device 6a, to generally horizontal and parallel to the direction of travel, for the unloading position, as shown for loading device 6b.

Although the drawings show two each of the feeding device, accumulator and unloading device, only one is essential. Having two unloading devices, with one on each side of the harvestor allow a greater flexibility of travel and particularly allows back and forth travel, since the trees can be unloaded on the side where they do not become an obstacle in the subsequent pass.

In operation, the circular saws 3 cut trees as they come into contact, as the harvestor moves forward. When the sensing means 13 detects the presence of a tree in the region of the saws, the selected feeding means 4 is activated whereby the corresponding arm 10 is pivoted from a position with the tree engaging portion 12 in front of the tree, as shown for 12(a), then engaging the tree and then through to the accumulator 5, as shown for 12(b), conveying the severed upright tree, and then returning to the origial position. With the desired feeding means-accumulator-unloading device unit selected, the diverter vane 14 is pivoted to facilitate flow of the trees to the corresponding accumulator.

The trees enter the accumulator through the inlet gate 20, wherein the resiliently biased arms 22 and 23 pivot away from one another to allow the trees to enter and then return to close.

For unloading, the grapple arms 40 of the unloading device grasps the trees and removes them through the resiliently biased arms 28 and 29 of the outlet gate 5. As the grapple is pivoted away from the accumulator, the linkage mechanism, comprising arms 41 and 42, and skewed pivot 43, cause the grapple to alter its orientation from a generally vertical orientation to generally horizontal and parallel to the direction of travel, as shown for unloading device 6(b).

We claim:

1. A continuous tree harvestor comprising:
support means for attaching to a vehicle;
tree severing means;
a generally horizontal support surface and guide means spaced above the support surface for supporting severed upright trees;
feeding device for advancing the severed upright trees onto and along the support surface;
an accumulator, comprising inlet gate means and outlet retaining gate means, for receiving trees advanced by the feeding means; and
an unloading device for removing trees from the accumulator and unloading them from the harvestor.

2. The apparatus of claim 1 wherein the feeding device comprises a plurality of vertically spaced generally horizontal arms mounted for pivoting about a generally vertical axis, said arms having a tree engaging portion.

3. A continuous tree harvestor comprising:
support means for attaching to a vehicle;
tree severing means;
a generally horizontal support surface and guide means spaced about the support surface for supporting severed upright trees;
a feeding device for advancing the severed upright trees onto and along the support surface, said feeding device comprising a plurality of vertically spaced generally horizontal arms mounted for pivoting about a generally vertical axis, said arms having a tree engaging portion;
a sensor for detecting the presence of a tree in the region of the tree severing means, and actuating means responsive to detection of a tree for activating the feeding device whereby the tree engaging portion of the arms is pivoted from a position in front of a tree through to the accumulator and returned.
an accumulator for receiving trees advanced by the feeding means; and
an unloading device for removing trees from the accumulator and unloading them from the harvestor.

4. The apparatus of claim 1 wherein the inlet gate comprises a pair of generally horizontal arms each pivotally mounted for pivoting about a generally vertical axis, the pivoting axis of one arm being spaced from that of the other, each arm having a generally radial portion and an arcuate portion spaced from and generally concentric with the vertical axis, resilient bias means for resiliently biasing the arms toward one another, and including limit means for limiting pivoting in the direction effected by the bias means, said gates being operative to allow passage of severed upright trees into the accumulator but preventing egress.

5. The apparatus of claim 1 wherein the outlet gate comprises a pair of generally horizontal arms each pivotally mounted for pivoting about a generally vertical axis, the axis of one arm being spaced from the other, resilient bias means for resiliently biasing the arm towards one another and operative to retain severed trees in the accumulator in the upright condition but allowing them to be withdrawn by the unloading means.

6. The harvestor of claim 1 wherein the unloading device comprises a grapple and a linkage mechanism connecting the grapple to the harvestor for movement between a position to grasp trees in the accumulator, to an unloading position.

7. The apparatus of claim 6 wherein the linkage mechanism comprises a pair of pivotally connected arms, and wherein the axis for the pivotal connection with the harvestor is skewed such that the grapple orientation changes from substantially vertical in a grasping position to generally horizontal and parallel to the direction of travel, for the unloading position.

8. The harvestor of claim 1 comprising a pair of feed devices, a pair of accumulators, a pair of unloading devices and diverter means for selectively directing trees into one or other accumulator.

9. The apparatus of claim 1 further comprising guide means spaced above the support surface for maintaining the severed trees upright.

10. The apparatus of claim 1 wherein the tree severing means comprises a pair of circular saws having cutting edges in proximity with one another oriented for rotation about a generally vertical axis.

* * * * *